May 21, 1929.  W. R. ALEXANDER  1,713,862
GEARLESS AND DUSTPROOF DRIVING MECHANISM FOR GRAIN DRILLS
Filed June 21, 1927   3 Sheets-Sheet 1
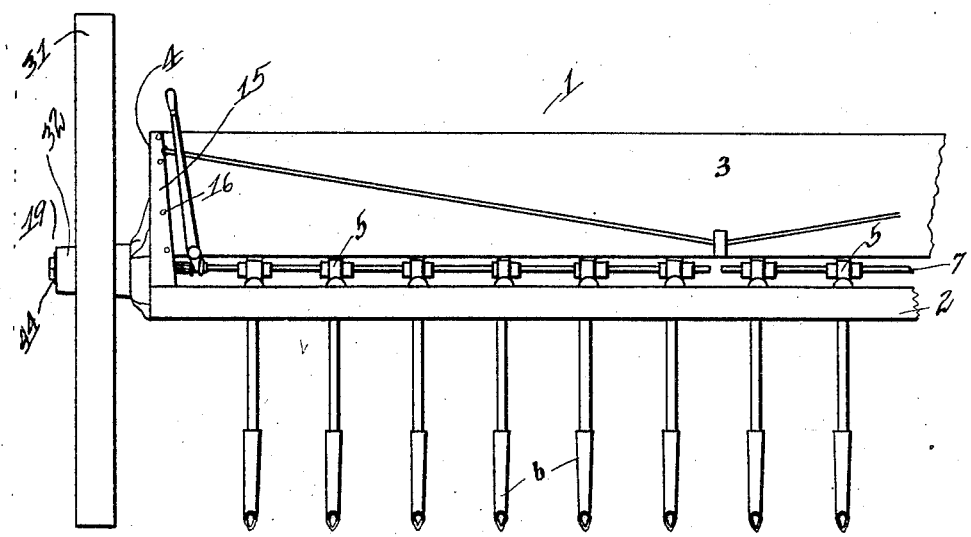
Fig. 1
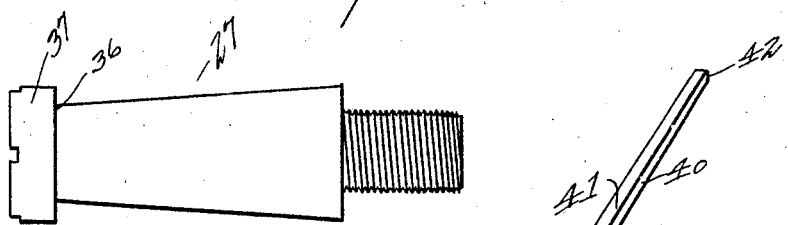
Fig. 3
Fig. 4
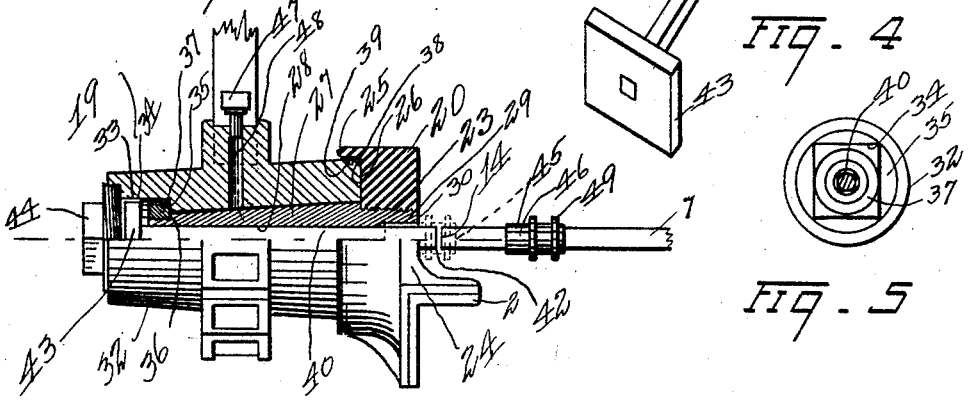
Fig. 5
Fig. 2
INVENTOR
William R. Alexander
BY
ATTORNEY May 21, 1929. W. R. ALEXANDER 1,713,862
GEARLESS AND DUSTPROOF DRIVING MECHANISM FOR GRAIN DRILLS
Filed June 21, 1927 3 Sheets-Sheet 2
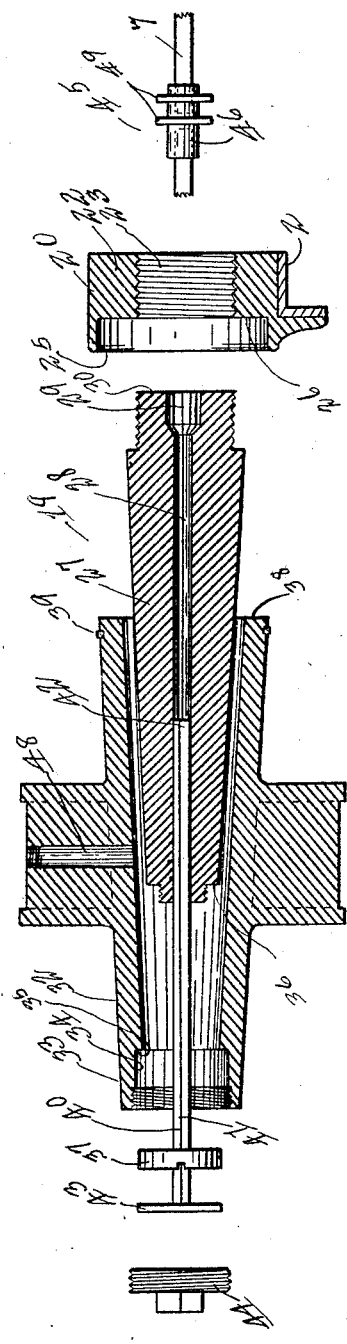
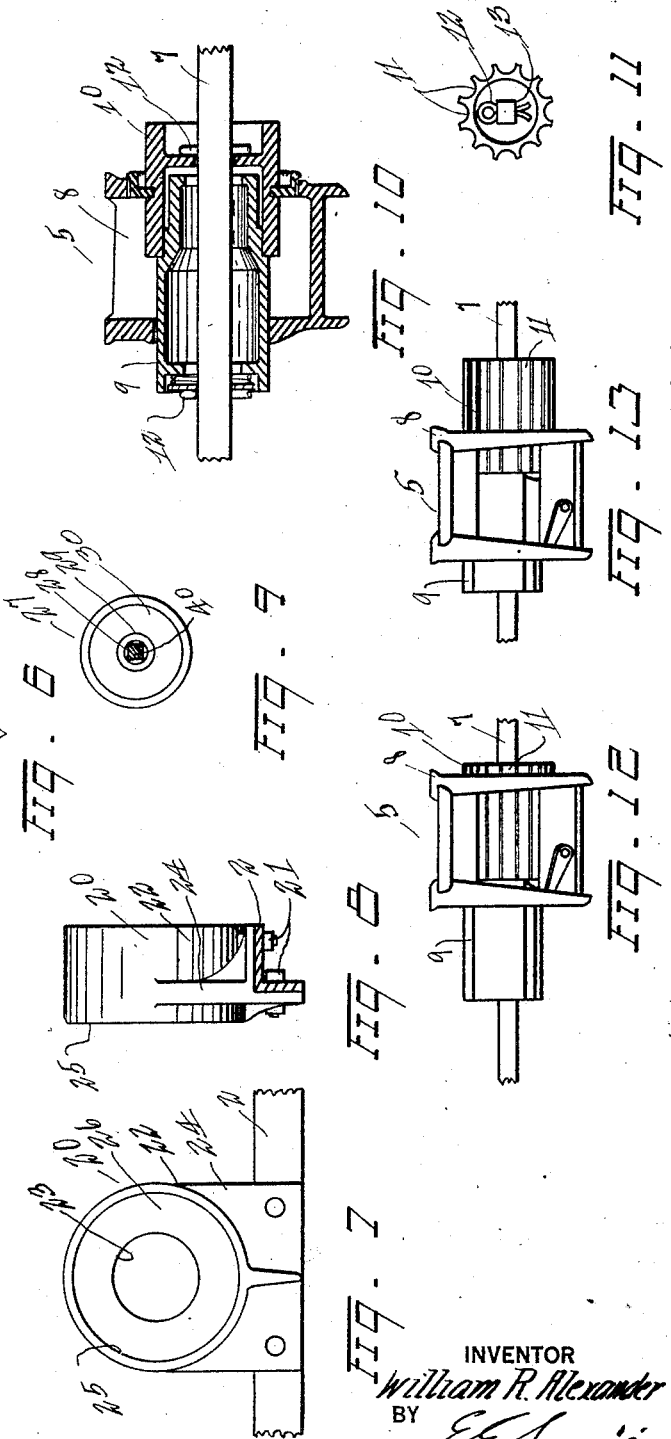
INVENTOR
William R. Alexander
BY
ATTORNEY May 21, 1929.  W. R. ALEXANDER  1,713,862
GEARLESS AND DUSTPROOF DRIVING MECHANISM FOR GRAIN DRILLS
Filed June 21, 1927   3 Sheets-Sheet 3

INVENTOR
William R. Alexander
BY
ATTORNEY

Patented May 21, 1929.

1,713,862

UNITED STATES PATENT OFFICE.

WILLIAM R. ALEXANDER, OF PRESCOTT, WASHINGTON.

GEARLESS AND DUSTPROOF DRIVING MECHANISM FOR GRAIN DRILLS.

Application filed June 21, 1927. Serial No. 200,238.

This invention relates to gearless and dust proof driving mechanisms for grain drills, and has as one of its objects, to provide a mechanism that is more economical to construct and more easily installed than former drives.

Another object of this invention is to provide a driving mechanism that is positive in its operation.

A further object of the invention is to provide a driving mechanism that is practically all concealed and providing means to render all bearings dust proof.

A further object of the invention is to provide a driving mechanism having an oiling system arranged continuous throughout its bearing surfaces, and utilizing the dust proof means to render the device oil proof.

A further object of the invention is to provide a driving mechanism that eliminates all gears and further eliminates the necessity of axles.

With these and other objects of the invention in view, reference is now had to the accompanying drawings in which—

Fig. 1 is a rear view of a fragment of a drill, showing one application of the driving mechanism;

Fig. 2 is an enlarged side elevation of the driving mechanism, partly in section, and showing one form of support;

Fig. 3 is a side elevation of the spindle, enlarged, showing the securing means attached thereto;

Fig. 4 is a perspective view of the driving spindle, enlarged;

Fig. 5 is an end view of the hub, enlarged, with plug removed;

Fig. 6 is an enlarged sectional side elevation of the parts of the device, the parts being positioned in their order of assembly;

Fig. 7 is a front elevation of the spindle support;

Fig. 8 is a side elevation thereof;

Fig. 9 is an inner end elevation of the spindle;

Fig. 10 is a sectional elevation of a feeder cup, showing its construction;

Fig. 11 is an end elevation of the feeder wheel showing method of attachment of the force feed driving rod;

Fig. 12 is a side elevation of the feeder cup in the open position;

Fig. 13 is a side elevation of the feeder cup, partly opened;

Figure 14:
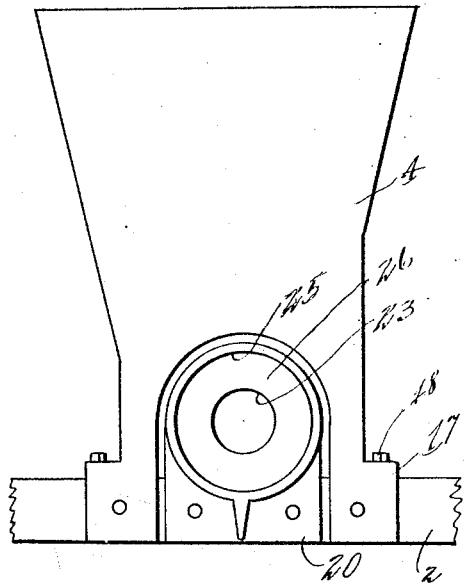
Fig. 14 is an end elevation of the grain box and spindle support, showing their relative positions.

Having reference to the drawings, like numerals refer to like parts throughout the several views, and the numeral 1 refers to a grain drill, a fragment only of which is shown, and the drill consists in the main, of a vehicle frame 2, a grain box 3 mounted on said frame, the ends of which are closed by end plates 4, that in turn rest upon and are secured to the frame as shown, with feeder cups 5 suitably attached to the bottom of said box, and carrying shoes 6, and a driving rod 7 slidably mounted in said cups to drive them and for possible sliding adjustment thereof.

Each cup consists of a shell 8 in which is slidably mounted a sleeve 9, the sleeve being inserted in the end thereof with a grain wheel 10 comprising a circular sleeve carrying channels 11 throughout its length, insertable from the opposite side of said shell to engage said sleeve centrally thereof, for alignment therewith, while the driving rod 7 is passed through the center of the sleeve and the wheel, to both of which the rod is secured against independent longitudinal movement by cotter keys 12 inserted into the rod, as shown in Fig. 10.

The parts mentioned may be adjusted to feed the proper amount of seed by sliding the rod longitudinally, which in turn slides the grain wheel laterally to present considerable of its surface, as shown in Fig. 12, in which position heavy seeding is accomplished; or a small portion of its surface, as shown in Fig. 13 where light seeding is to be accomplished.

It is obvious that other details of construction and operation of the cups may be entered into, but this is deemed unnecessary as this mechanism is old in the art and well understood by those skilled therein, and as further matter of the construction of the drill does not affect the invention.

The driving rod 7 is divided centrally, as shown in Fig. 1, to provide for independent movement of either half of the drill, as when turning corners, when one wheel will remain practically stationary while the other advances about the circle.

The rod is preferably square in cross section and engages the square hole 13 formed in the end of the grain drill (see Fig. 11) whereby the wheel may be rotated by the driving mechanism, to be explained, the rotation of this wheel carrying the grain from the grain box 3 to deposit it in the ground through the shoes 6 in the usual manner, and the rod as shown in this invention terminates at its outer end at a point 14 in close proximity to the end plates or spindle support, as shown in Fig. 2, to be explained.

The end plate 4 consists of a face plate having turned edges 15 to which are secured the boards forming the grain box, by bolts 16, and the lower portion 17 is offset to rest upon and be secured to the frame 2 in any suitable manner, as by the bolts 18.

The grain box by suitable trussing acts as a support for the grain cups and is so connected to the frame that, with the driving mechanism shown, the necessity for an axle is entirely removed.

Figure 15:
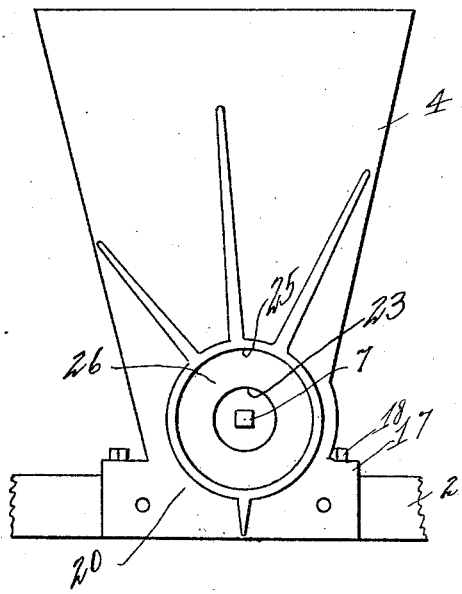
Fig. 15 is an end elevation of the grain box showing a modified form of spindle support integral therewith.

The driving mechanism 19, which will now be explained, is substantially supported by the frame, the supporting member consisting of a spindle support 20 which may be designed as shown in Figs. 2, 6, 7, 8, and 14 in which it consists of a single independent unit attached to the frame by any approved means, as the bolts 21 shown in Fig. 8, or the support may be constructed integral with the end plate of the grain box as shown in Fig. 15.

In either case the spindle support consists of a body portion 22 which contains a centrally disposed spindle orifice 23, of relatively large diameter, and the body portion is positioned with respect to the driving rod with the spindle orifice in alignment therewith.

The spindle support has certain reinforcing members consisting of side braces 24 and specifically of a reinforcing ring 25 formed concentric with the spindle orifice, the ring being adapted to provide a dust cap, the purpose of which will be presently explained, and is extended outward for the purpose.

The surface of the body between the reinforcing ring and the spindle orifice is machined to provide a thrust plate 26 of ample dimensions to take up the thrust and maximum wear of the drill, as when operating on side hills.

Removably mounted in said support, and in the spindle orifice thereof, is a spindle 27 of the usual tapered design, and this spindle contains longitudinally disposed internal bearings of different diameters aligned with said driving rod, one of the bearings 28 acting as a bearing for a driving spindle, to be explained, and the other of the bearings 29 acting as a driving coupling bearing, the latter being positioned at the inner end 30 of said spindle, while the driving spindle bearing extends throughout the length of the spindle.

Mounted on said spindle is a wheel 31, the hub 32 of which is of greater length than the spindle, the surplus 33 extending beyond the spindle and containing therein an internal driving socket 34 preferably of rectangular outline, the socket terminating in an internal shoulder 35 positioned adjacent to a similar shoulder 36 on the spindle, and the hub is removably secured to the spindle by an internal securing means consisting of a nut 37 recessed as shown in Fig. 3 or as shown in Fig. 6, to accommodate a wrench, the nut being engageable with the outer end of the spindle and in register with and against the internal shoulder of the hub for the purpose, and being round to prevent being rotated in the socket 34 by the movement of the hub.

The inner face 38 of the hub is machined to form a thrust bearing to register with the thrust plate 26 of the spindle support and is provided about its perimeter with a dust proof packing 39 positioned to engage and seal the inner end of the hub with the dust cap 25 when assembled, preventing the ingress of dust or the egress of oil at this junction.

The driving spindle 40, above mentioned, consists of a rod 41 preferably of rectangular cross section at its shank or inner end 42 and is rotatably mounted in the driving spindle bearing within the spindle, by passing through the nut 37, to be guided therein to perfect alignment with the driving rod, with which it is adapted for separable direct attachment, in a manner to be explained.

The driving spindle 40 includes a rectangular head 43 engageable with the internal driving socket 34 of the hub, and is adapted for removal therefrom and through the securing nut 37, without the necessity of removing the hub.

Securing the driving means in the driving socket is a plug 44, of the usual form, engageable with the hub, and the plug in addition to being a securing means is adapted to seal the outer end of the hub against the ingress of dust or the egress of oil used to lubricate the moving parts.

Slidably and rotatably mounted in the driving coupling bearing 29, and on the square shank 42 of the driving spindle, is a coupling 45 adapted to slidably engage and disengage the driving rod 7, and is provided with a shank 46 of a length to accommodate any sliding adjusting movement of the driving rod, and is of a diameter to permit its removal and insertion through the spindle orifice 23 for the purpose of assembly, the spindle orifice being constructed relatively large for the purpose, and to provide strength for the spindle.

The coupling 45 is adapted to fit the inner end 42 of the driving spindle, thus forming a separable, direct attachment with the driving rod, and to close the driving coupling bearing with its shank with reasonable nicety to provide a seal for the end of the spindle.

By this means it will be noted, that, a driving means consisting of the driving spindle, the head, and the coupling, is provided that is practically all contained within the hub; that both ends of the hub are sealed as well as the inner end of the spindle, and hence an oiling system consisting of the usual cup 47 and channel 48 is accomplished that will maintain lubrication therein for a maximum period of time with a minimum sized container; and with the exclusion of dust and dirt, that the device will have a relatively long life.

In use the device will be assembled by attaching the spindle support to the framework in the usual manner. Where the spindle support is a separate unit and used in connection with the end plate as shown in Fig. 14, the end plate will be recessed to fit over the support.

With the support attached to the drill the spindle is screwed into the enlarged spindle orifice. The hub is then placed upon the spindle and internally secured thereon by means of the nut which threadedly engages the outer end of the spindle and which rests against the shoulder of the internal driving socket to maintain the hub in position on the spindle. The driving spindle is then inserted in the driving spindle bearing, within the spindle, with its head resting in the socket which is of similar form to the head to rotate that member as the hub rotates. The plug is now screwed into the driving socket with the result that that end is sealed and the parts within are secured, and with the assembling of the inner end of the hub into the reinforcing ring or dust cap, the packing then sealing that end of the hub.

Prior to assembling the spindle in the spindle support the coupling, the flanges 49 of which are of a diameter less than the diameter of the spindle orifice 23, has been inserted therethrough and mounted on the driving rod 7 and is so positioned that the shank 46 of the coupling will enter the driving coupling bearing 29 of the spindle and about the driving spindle, the end of which is engaged with the coupling and the coupling thereby sealing the inner end of the spindle.

Thus sealed, oil from the oil cup will pass through the channel to lubricate the hub on the spindle and other wearing parts, and the lubricant not being able to leak out of the front end of the hub, that portion being sealed by the plug, nor out of the rear end of the hub which is sealed with the packing, nor out of the inner end of the spindle which is sealed by the coupling, it is obvious that perfect lubrication will obtain with a minimum consumption of lubricant.

It is also obvious that the driving spindle may be removed by the removal of the plug only; the driving rod may be slidably removed therethrough after removing the cotter keys; and that the coupling may be removed by removing the spindle without removing the spindle support, that member thus maintaining its alignment with the force feed driving rod. Any suitable means may be used to shift the coupling, such a means not being shown as it is old in the art, as is the usual means of sliding the driving rod for the adjustment of the grain cups which is also not shown, as it is old in the art.

By this means the rotation of the wheel on the spindle will rotate the driving spindle, this in turn rotating the driving rod, thus driving the operating mechanism of the drill, and by the combined purposes of the reinforcing ring which forms a dust cap; the plug which forms a securing means for the head and provides a dust tight closure for the outer end of the hub; and the coupling which forms a connecting means between the driving and driven means, and provides a closure for the spindle, a highly efficient driving means is provided.

Obviously an exposed driving means, consisting generally of gears, is subjected to considerable wear from the dust and lack of suitable lubrication, hence the above invention which eliminates driving gears, dust in the bearings and improper lubrication, provides by the direct drive, as the drill moves over the ground to be seeded, a steady flow of the seed grain that is conducive to a uniform stand of grain.

Having thus described my invention, I claim:

1. In a gearless and dust proof driving mechanism for grain drills, a driving rod, a spindle support attached to said drill and containing a spindle orifice, and provided with a reinforcing ring forming a dust cap, a spindle removably mounted in said orifice, and containing longitudinally disposed and aligned internal bearings of different diameters, a hub mounted on said spindle, and containing an internal driving socket, and an internal securing means removably attached to said spindle, a dust proof packing carried by said hub and positioned to engage said dust cap to form a seal therewith, driving means securably contained within said hub in register with the driving socket, and rotatably mounted within the internal bearings of said spindle, to maintain and provide a constant alignment with said driving rod, and adapted for separable direct attachment therewith, and removal through said securing means, and means to secure the driving means within the hub, said means forming a seal for said hub, a coupling slidably mounted in the bearing of largest diameter of said spindle and on said driving means, and adapted to engage and disengage said driving rod, and to form a seal for the inner end of said spindle.

2. In a gearless and dust proof driving mechanism for grain drills, a driving rod, a spindle support attached to said drill and containing a spindle orifice, and provided with a reinforcing ring forming a dust cap, and a thrust plate formed in said ring, a spindle removably mounted in said orifice, and containing longitudinally disposed internal bearings of different diameters aligned with said driving rod, a hub mounted on said spindle and containing an internal driving socket, and an internal securing means removably attached to said spindle in register with said hub, a dust proof packing carried by said hub and positioned to engage said dust cap to form a seal therewith, a thrust bearing formed on said hub to register with said thrust plate, a driving means securably contained within said driving socket, and rotatably mounted within the internal bearings of said spindle, to maintain and provide a constant alignment with said driving rod and adapted for separable direct attachment therewith and removal through said securing means, and means engageable with the hub to secure said driving means therewithin, said means forming a seal therefor, a coupling slidably mounted in the bearing of larger diameter of said spindle and on said driving means, and adapted to engage said driving rod, and to form a seal for the inner end of the spindle.

3. In a gearless and dust proof driving mechanism for grain drills, a driving rod, a spindle support attached to said drill and containing a spindle orifice of relatively large diameter positioned in alignment with said driving rod, and provided with a reinforcing ring forming a dust cap, and a thrust plate formed in said ring, a spindle removably mounted in said orifice, and containing a driving spindle bearing and a driving coupling bearing aligned with said driving rod, a hub mounted on said spindle and containing an internal driving socket, and an internal securing means removably attached to said spindle and in register with said hub, a dust proof packing carried by said hub, and positioned to engage said dust cap to form a seal therewith, a thrust bearing formed on said hub to register with said thrust plate, driving means securably contained within said hub in register with the driving socket, and adapted for separable direct attachment with said driving rod, and removal through said driving means, and a plug engageable with the hub to secure said driving means therewithin, said plug forming a seal for said hub, a coupling adapted for removal and insertion through said relatively large spindle orifice, and slidably mounted in the driving coupling bearing and on said driving means, and adapted to engage and disengage and accommodate the adjustment of said driving rod, and to form a seal for the inner end of said spindle.

4. In a gearless and dust proof driving mechanism for grain drills, the combination of a driving rod, a spindle support attached to said drill and containing a spindle orifice of relatively large diameter positioned in alignment with said driving rod, and provided with a reinforcing ring forming a dust cap, and a thrust plate formed in said ring, a spindle removably mounted in said orifice, and containing a driving spindle bearing and a driving coupling bearing aligned with said driving rod, a hub mounted on said spindle and containing an internal driving socket, and an internal securing means removably attached to said spindle and in register with said hub, a dust proof packing carried by said hub, and positioned to engage said dust cap to form a seal therewith, a thrust bearing formed on said hub to register with said thrust plate, driving means securably contained within said hub in register with the driving socket, and adapted for separable direct attachment with said driving rod, and removal through said driving means, and a plug engageable with the hub to secure said driving means therewithin, said plug forming a seal for said hub, a coupling adapted for removal and insertion through said relatively large spindle orifice, and slidably mounted in the driving coupling bearings and on said driving means, and adapted to engage and disengage and accommodate the adjustment of said driving rod, and to form a seal for the inner end of said spindle.

In testimony whereof I have affixed my signature.

WILLIAM R. ALEXANDER.